Oct. 17, 1961    F. V. McCAY ET AL    3,004,524
HYDRAULIC CYLINDER AND PISTON ARRANGEMENT
Filed July 20, 1960    4 Sheets-Sheet 1

INVENTORS.
FRANK V. McCAY
BY JOHN R. AUSTIN
Horace B. Van Valkenburgh
ATTORNEY

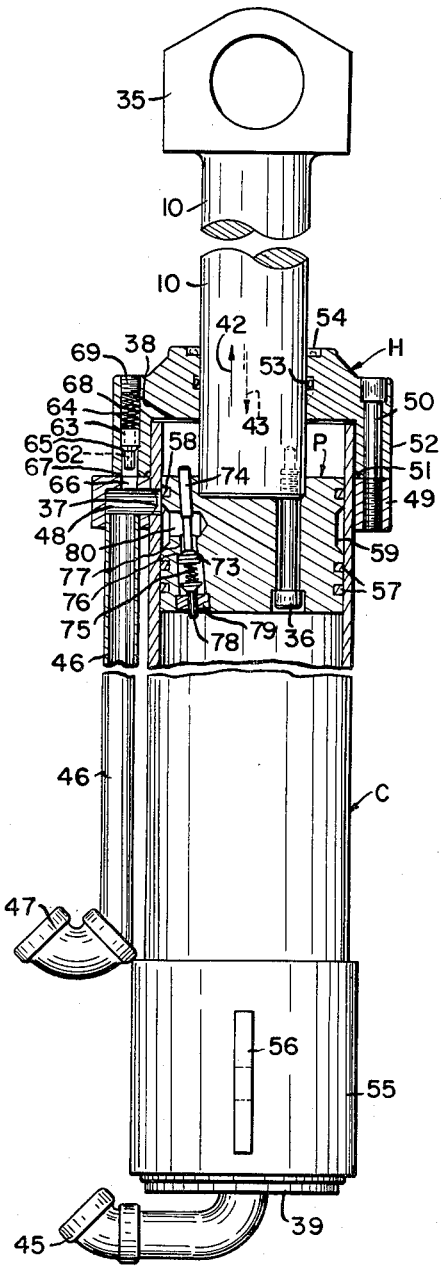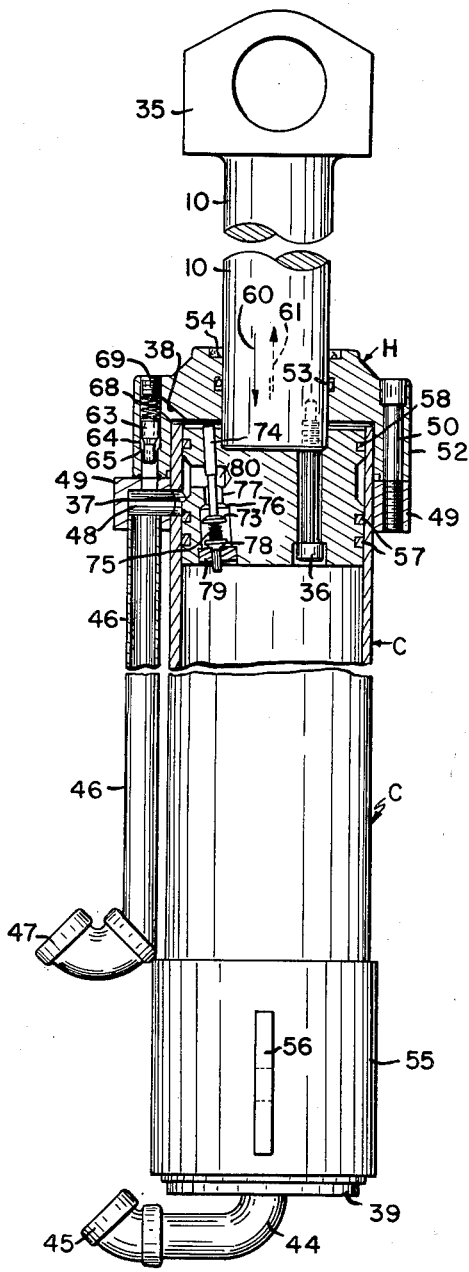

Oct. 17, 1961 F. V. McCAY ET AL 3,004,524
HYDRAULIC CYLINDER AND PISTON ARRANGEMENT
Filed July 20, 1960 4 Sheets-Sheet 3
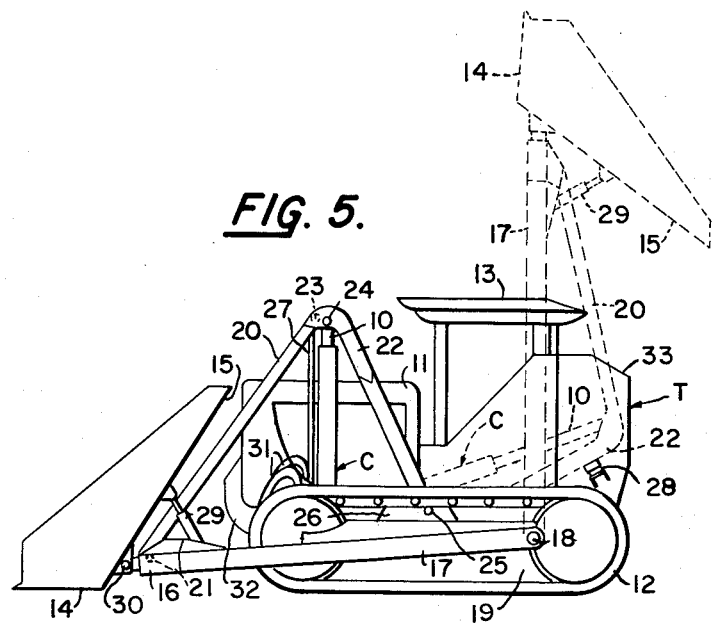
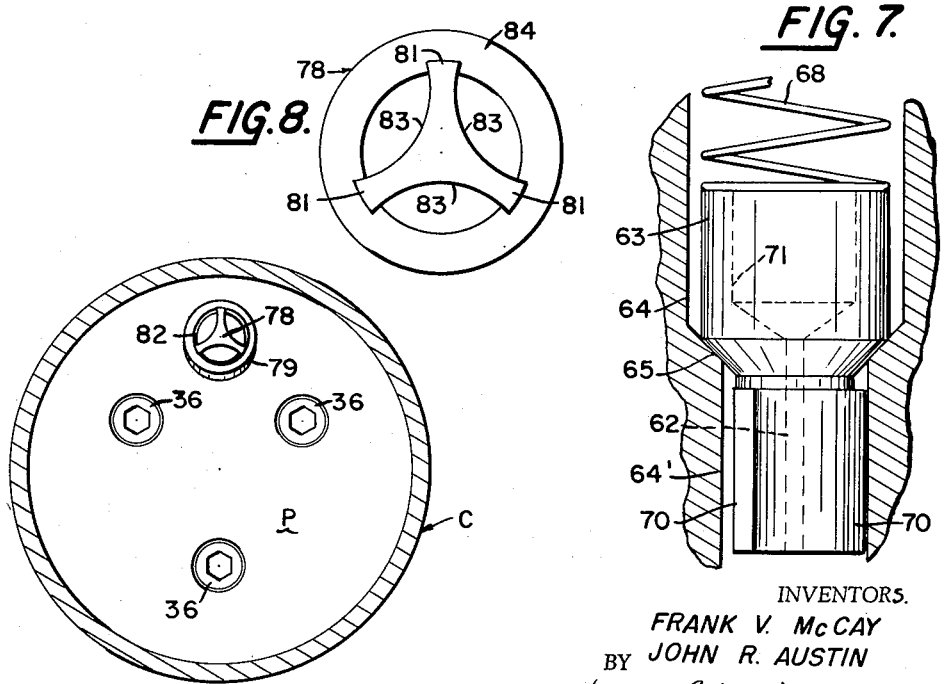
INVENTORS.
FRANK V. McCAY
JOHN R. AUSTIN
BY
Horace B. Van Valkenburgh
ATTORNEY Oct. 17, 1961     F. V. McCAY ET AL     3,004,524
HYDRAULIC CYLINDER AND PISTON ARRANGEMENT
Filed July 20, 1960     4 Sheets-Sheet 4

INVENTORS.
FRANK V. McCAY
JOHN R. AUSTIN
BY Horace B. Van Valkenburgh
ATTORNEY

United States Patent Office 3,004,524
Patented Oct. 17, 1961

3,004,524
HYDRAULIC CYLINDER AND PISTON
ARRANGEMENT
Frank V. McCay, Salt Lake City, Utah, and John R.
Austin, 1635 Kearney St., Denver, Colo.; said McCay
assignor to said Austin
Filed July 20, 1960, Ser. No. 44,144
22 Claims. (121—38)

This invention relates to hydraulic cylinder and piston arrangements, and more particularly to such an arrangement in which a cushion effect is provided at or adjacent the end of the piston stroke in one or in both directions of a double acting cylinder and piston arrangement.

A hydraulic piston and cylinder arrangement in which a cushion effect is provided at or adjacent the end of the piston stroke has use in many types of apparatus, but is particularly valuable for use in an overshot loader, such as of the type of the John R. Austin U.S. Patent 2,696,314. In such an overshot loader, a linkage arrangement is actuated by a hydraulic cylinder mounted on each side of a tractor or other support for a boom carrying a bucket. The bucket is loaded while in front of the tractor, as by movement of the bucket into a pile of material to be picked up, such as dirt, rock, sand, gravel or the like, then the bucket is elevated and moved to a position at or slightly rearwardly of upper dead center in order to unload the contents of the bucket rearwardly, such as for discharge into a truck to which the tractor may be backed, after loading, thus avoiding the necessity of turning the tractor around for unloading. The bucket may be provided with a rearwardly and angularly disposed dumping section across which the contents of the bucket may be discharged rearwardly, with the bucket in elevated position. When the loaded bucket is swung upwardly, considerable force is necessary to start the bucket in movement, but the force required to maintain movement of the bucket decreases as the top dead center position is approached; also, as soon as the latter is reached, the momentum of the bucket and its contents, as well as the force of gravity tending to pull the bucket downwardly in a rearward direction, produces forces of considerable magnitude, which are acting in the same direction as the thrust of the hydraulic cylinder pistons. The resultant momentum of these forces is sufficient, when the motion of the bucket is suddenly arrested for discharge of its contents, to produce concentrated stresses on the linkage and support for the bucket, with the result that supporting and linkage parts may be bent or broken, bearings may be cracked or otherwise damaged, while parts of the tractor itself may also suffer damage. Also, even though damage may not be produced at once, the continued intermittent production of such stresses may produce failure of parts within a period of time. If the operator attempts to slow the motion of the bucket by hand operation of the hydraulic control valve, to terminate the supply of fluid under pressure to the hydraulic cylinder before the bucket reaches top dead center, the momentum of the bucket and its contents, as well as the force of gravity thereon, often produces forces of sufficient magnitude to cause damage when the movement of the bucket is suddenly arrested. Furthermore, such attempts by the operator to slow down the movement of the bucket by manual control unduly increase the time required for the unloading operation, thus reducing considerably the total amount of material which the apparatus is able to move over a particular period of time, such as one day.

Among the objects of the present invention are to provide a novel hydraulic cylinder and piston arrangement; to provide such an arrangement which automatically produces a cushioning effect at or adjacent the end of a piston stroke; to provide such an arrangement in which a cushioning effect may be produced at each end of the piston stroke and if desired a greater cushioning effect at or adjacent the end of the piston stroke in one direction than in the other; to provide such an arrangement which does not require control by the operator, but acts automatically; to provide such an arrangement in which the cushioning effect produced at or adjacent the end of the piston stroke in one or both directions does not interfere with the rapidity of the movement of the piston over the remainder of the stroke in each direction; to provide such an arrangement which is particularly adapted to be used in connection with an overshot loader, but is also adapted to be used in connection with numerous other types of apparatus; to provide such an arrangement which may be readily manufactured; and to provide such an arrangement which will be efficient and effective in operation.

Additional objects and the novel features of this invention will become apparent from the description which follows, taken in connection with the accompanying drawings, in which:

FIG. 3 is a condensed side elevation, partly in longitudinal section, showing the piston in a still different position;

FIG. 4 is a condensed side elevation similar to FIG. 3, but showing the piston in a still different position;

FIG. 5 is a side elevation of an overshot loader in which the hydraulic cylinder and piston arrangement of FIGS. 1–4 is particularly adapted to be used;

FIG. 6 is a cross section, taken along line 6—6 of FIG. 1, on a slightly larger scale;

FIG. 7 is an enlarged fragmentary longitudinal section of a portion of the cylinder head, shown also in FIGS. 2, 3 and 4, illustrating in greater detail the construction of a throttling bypass valve;

FIG. 8 is an enlarged end view of a poppet type relief valve mounted in the piston;

Figure 1:
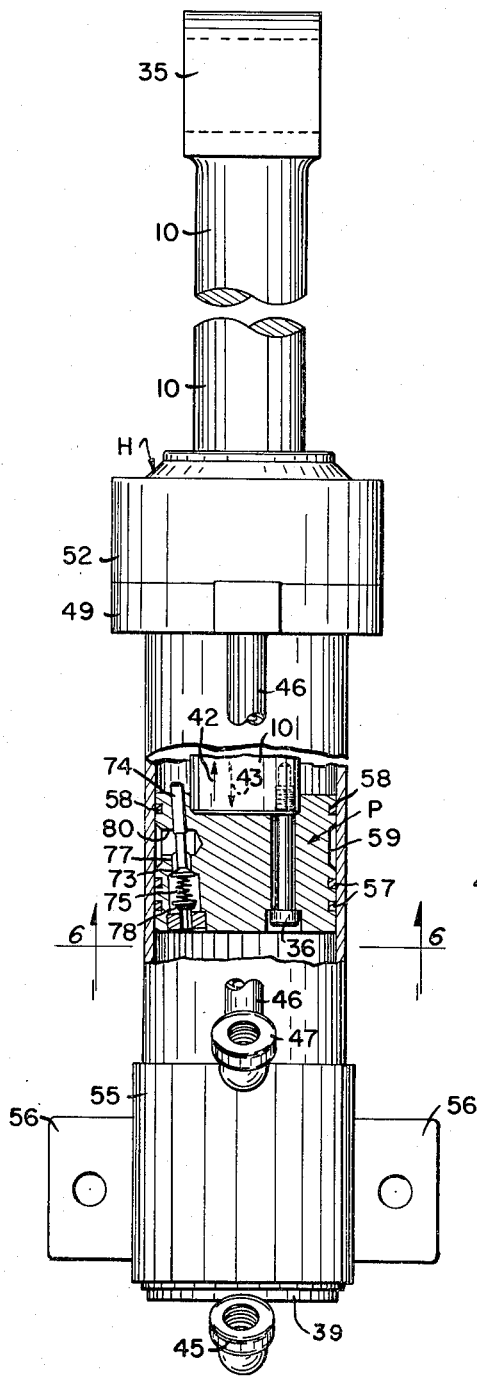
FIG. 1 is a condensed side elevation, partially in longitudinal section, of a cylinder and piston arrangement constructed in accordance with this invention.

As indicated previously, a double acting cylinder and piston arrangement, such as including a cylinder C from which extends a piston rod 10, may be used in an overshot loader, such as illustrated in FIG. 5. Such an overshot loader may be mounted on a crawler type tractor T having an engine 11, treads 12 and a cab 13 within which may be installed the control levers for operating the tractor and also a bucket 14 adapted to be moved between a loading position, shown at the front of the tractor in full lines, and an unloading position, shown in dotted lines. In the latter, the bucket 14 has moved rearwardly to or past dead center for discharge of the contents of the bucket through an angularly disposed, rearwardly extending skirt section 15, the sides of which are conveniently integral with the sides of the bucket. The bucket 14 may be mounted on the front of a yoke or boom having a front bar 16 and an arm 17 extending rearwardly therefrom along each side of the tractor and pivoted at a bearing 18 adjacent the rear of the crawler frame 19 on each side. The linkage arrangement for moving the bucket 14 may be similar to that of the aforesaid U.S. Patent 2,696,314, thereby including on each side a front link 20 pivotally connected at its lower front end to the yoke, as by a pin 21, shown in dotted lines, and at its upper rear edge to a rear link 22, as by a pin 23. The upper end of piston rod 10 may be pivotally connected, as at a pin 24, to the rear link 22, while the lower rear end of the latter may, in turn, be pivotally mounted by a pin 25 on a special plate 26 provided on the tractor frame for that purpose. The lower end of cylinder C may be pivotally mounted on a bracket, also mounted on the tractor frame. Small rocks, or other debris may be prevented from causing damage to piston rod 10 through a piston rod guard 27, which may be constructed in the manner of the John R. Austin U.S. Patent No. 2,764,303. As will be evident, when piston rod 10 is extended from cylinder C, the bucket 14 is raised upwardly along an arc from a lower position to an upper position and to upper dead center, at or after which the bucket may travel rearwardly to a discharge position, such as shown in dotted lines, in which each rear link 22 will engage a resilient bumper block 28 mounted at the rear of the tractor. However, the forces required to stop the bucket and its contents suddenly, particularly for the larger sizes of overshot loader, are tremendous, as indicated previously, and are too great to be absorbed by bumper block 28 without the possibility of damage to the various parts.

It will be understood, of course, that a cylinder C and piston rod 10, as well as a yoke arm 17 and links 20 and 22 are disposed on each side of the tractor. Also, the position of the bucket relative to the outer end of the yoke may be altered at will by a separate hydraulic cylinder and its accompanying piston and piston rod, or adjusted by a suitable screw adjusting device 29. For such purpose, bucket 14 may be pivotally mounted, as by a pin 30, at each side, on the outer end of the yoke. Hydraulic fluid may be supplied to and from the cylinder C by hoses 31; a hydraulic pump may be driven by the tractor engine 11 and conveniently located forwardly of the same beneath a sheet metal guard 32; a hydraulic reservoir 33 may be disposed within cab 13 or rearwardly thereof, as shown; and various control valves, operating levers and hoses, an oil cooler, a filter and other conventional types of equipment, which do not form part of the present invention and therefore are not shown, may also be provided and installed in convenient positions.

Figure 2:
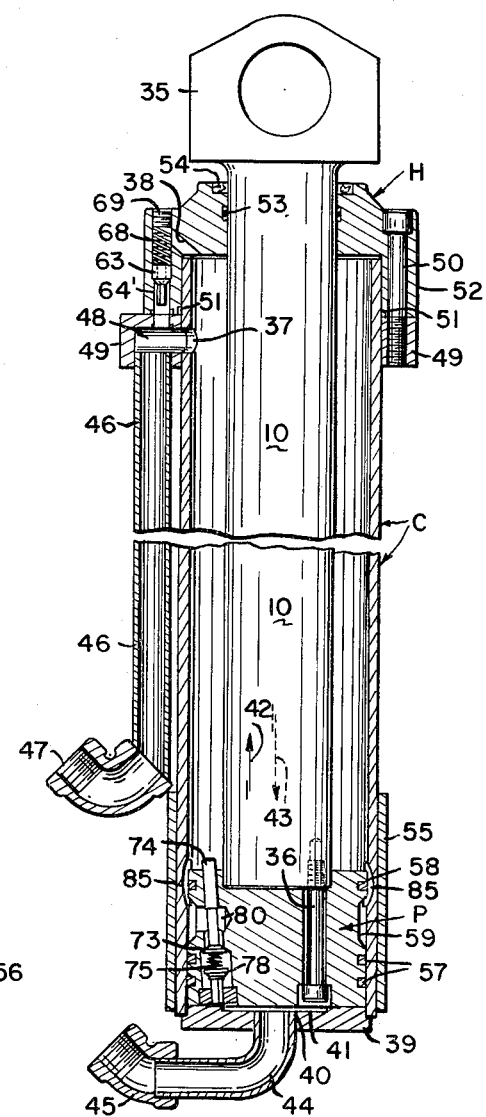
FIG. 2 is a condensed, central longitudinal section of the cylinder and piston arrangement of FIG. 1, taken 90° from FIG. 1 and showing the piston in a different position.

In accordance with the present invention, the cylinder C at each side of the tractor may be constructed in the manner shown in FIGS. 1 and 2. Thus, piston rod 10 may be provided with a trunnion 35 at its outer end and extend through a cylinder head H into the interior of the cylinder C, for attachment to a piston P, as by a series of cap bolts 36, as shown also in FIG. 6. The cylinder C is provided with port means for its opposite ends, such as a main port 37 of FIG. 2, spaced from a first end of the cylinder, such as the end of which cylinder head H is attached, and an auxiliary port 38 conveniently formed in cylinder head H and communicating with the cylinder at the first end thereof. (As described later, in connection with FIG. 9 and 10, the auxiliary port may be formed in the piston.) The opposite or second end of cylinder C may be closed by a plate 39 having a port 40 disposed centrally thereof, as in FIG. 2, plate 39 conveniently being provided with a shallow, central well 41 to permit the hydraulic fluid to be applied against a greater area of the piston P when it is started from the second end, as in the direction of the solid arrow 42 of FIG. 2, it being noted that in FIG. 2 the piston P has previously moved to its end position in the direction of the dotted arrow 43. Means for supplying hydraulic fluid to, and removing hydraulic fluid from, the various ports may include a tubular connection 44, attached as by welding to plate 39 about port 40 and terminating in a 45° L 45 to which one of the hoses 31 of FIG. 5, or a corresponding hose or pipe for any other type of installation, may be connected. Hydraulic fluid may be supplied to and removed from the first end of cylinder C through a tube 46 welded or brazed to an L 47, to which the opposite hose 31 of FIG. 5, or the corresponding pipe or hose for any other type of installation, may be connected. The opposite end of the tube 46 may be attached, as by welding or brazing, in an axial hole which communicates with a radial hole 48 in a boss of a ring 49, with hole 48 terminating short of the outer edge of ring 49 and also being in alignment with port 37. Ring 49 may be welded or otherwise suitably attached to the exterior of cylinder C, to permit attachment of head H thereto, as by cap bolts 50, with a seal ring being placed in a groove 51 provided for that purpose around the inner edge of a depending flange 52 of head H, which surrounds the first end of cylinder C and through which cap bolts 50 may extend. Head H may also be provided with an interior groove for a seal ring 53 surrounding piston rod 10 and an outer groove 54 for receiving a wiping disc adapted to remove dust and the like from the piston rod. A sleeve 55 may surround the opposite end of cylinder C and be welded thereto for attachment of supporting ears 56, by which the lower end of the cylinder may be pivotally mounted, although any other suitable type of mounting or attachment for the second or closed end of the cylinder may be used. It will be understood, of course, that the ports 37 and 38, while shown as placed at the piston rod end of the cylinder for the particular installation illustrated as an example, may be placed at the opposite end of the cylinder in the event that the maximum cushioning effect is to be produced when the piston is moving in the opposite direction, i.e., in the direction of the solid arrow 42 of FIG. 2. The piston P may further be provided with spaced grooves adapted to receive piston rings, such as a pair of piston rings 57 and a piston ring 58, respectively disposed on opposite sides of an annular groove 59, the latter being provided for a purpose described later, while piston rings 57 and 58 may be provided with overlapping shoulders to effect a better seal, although any other suitable type of piston ring may be used.

It will be noted that the solid arrow 42 of FIGS. 1, 2 and 3 indicates the direction of movement of the piston P and rod 10 with the various parts in the positions shown, while the dotted arrow 43 indicates the opposite direction, which may be the direction of movement shortly prior thereto, as in FIG. 2, or shortly thereafter, as in FIG. 3, or on the opposite stroke, as in FIG. 1. Similarly, the solid arrow 60 of FIG. 4 indicates the direction of movement of piston P and rod 10 with the parts in the positions shown, while the dotted arrow 61 indicates movement in the opposite direction, such as shortly prior thereto.

In accordance with this invention and as will be evident from FIG. 3, with the piston moving in the direction of the solid arrow 42, as soon as piston ring 58 reaches the position shown, i.e., the edge of port 37 toward cylinder head H, the port 37 will be closed off from the first end of the cylinder and the hydraulic fluid between the piston and cylinder head will be trapped, thus providing a cushioning effect. While the hydraulic fluid so trapped will tend to be forced out through auxiliary port 38, such flow is restricted by an orifice 62 in a back pressure valve 63 which may be disposed within a passage 64 and normally engaged by a seat 65, passage 64 connecting with auxiliary port 38 at one end and at the opposite end with a hole 66 leading to hole 48 in ring 49. For sealing purposes, a seal ring may be placed in an annular groove 67 at the inner end of passage 64 and abutting ring 49. Valve 63 is normally held against seat 65 by a spring 68 acting between the end of the valve and a plug 69, which closes the outer end of passage 64. As will be evident, in addition to the pressure of spring 68 when trapped fluid is being forced through port 38, such pressure of fluid also maintains valve 63 against the seat. Valve 63, as in FIG. 7, may be cylindrical at its larger end but provide clearance for flow of fluid therearound when unseated, and provided at its smaller end with radially spaced guide wings 70, such as three in number, which engage the wall portion 64' of passage 64 of smaller diameter, inwardly from seat 65. Also, a well 71 may be provided in the larger end of valve 63, for convenience in drilling orifice 62. Valve 63 is, of course, unseated when fluid under pressure is supplied through tube 46 to move the piston in the opposite direction, i.e., the direction of the dotted arrow 43 of FIG. 3 or the solid arrow 60 of FIG. 4, as shown.

In further accordance with this invention, in addition to the cushioning effect produced by the trapping of fluid between the piston and cylinder head toward the end of the stroke, the pressure of fluid on the opposite side of the piston may also be relieved upon termination of the stroke, preferably through suitable means carried by the piston itself. Such means may include an unloading valve 73 having a stem 74 which extends through the rod end of the piston and is preferably inclined at a slight angle to the axis of the piston, so as to open and close more readily, and is normally held by a spring 75 against a seat 76, formed in an inclined passage 77 in the piston. Spring 75 acts between unloading valve 73 and a check valve 78 which seats against an insert 79, installed in the end of passage 77, the latter of which also communicates through a hole 80 with the annular groove 59. Check valve 78, as in FIG. 8, may be provided with a series of guide wings 81, which have arcuate outer surfaces so as to engage the wall of a passage 82 in insert 79 and provide stability to the valve. Guide wings 81 may be formed by milling out the arcuate surfaces 83 between the guide wings and it will be noted that guide wings 70 of valve 63, shown in FIG. 7, may be formed in a similar manner. A conical seating portion 84 of valve 78 may also begin slightly inwardly from the wings 81 and is adapted to engage a bevel seat formed at the upper end of passage 82 in insert 78.

During movement of the piston P in the direction of arrows 42 of FIGS. 1 and 3, the pressure of fluid against the piston will unseat check valve 78, as indicated, but spring 75 will maintain unloading valve 73 closed. However, as the piston P approaches the cylinder head H, the extending end of stem 74 of unloading valve 73 will engage the head H, to open valve 73, as in FIG. 4, it being understood that the piston is then moving in the direction of the solid arrow 42 of FIG. 3 or the dotted arrow 61 of FIG. 4. Thus, fluid pressure against the piston will be relieved by passage around the then unseated check valve 78, unloading valve 73 and through hole 80 and piston groove 59 to port 37. As soon as piston P reaches the end of its stroke, fluid under pressure will be supplied through tube 46 and will cause check valve 78 to seat, as shown in FIG. 4, and the piston to be started in its movement in the direction of the solid arrow 42 of FIG. 4, through the unseating of back pressure valve 63, as shown, to supply fluid under pressure to the space between piston P and head H through auxiliary port 38. At the beginning of its movement in the direction of arrow 60 of FIG. 4, the piston P will be moved comparatively slowly by the fluid supplied through port 38, but as soon as piston ring 58 clears the rear edge of port 37, the full supply of pressure fluid will be exerted against the piston through port 37.

The foregoing action of the unloading valve 73 and check valve 78 may be correlated with the part or parts which are moved by the piston rod 10. For instance, in the case of the overshot loader illustrated in FIG. 5, the piston ring 58 may seal off the port 37 before the bucket 14 reaches its upper dead center position, so that the fluid trapped between the piston and cylinder head will slow down the bucket and the cushioning effect thereby provided will reduce the speed and momentum of the bucket and its contents so that, when bucket 14 reaches the discharge position, the impact of links 22 against bumper blocks 28 will not be unduly severe. Of course, just before the discharge position is reached, the unloading valve 73 will also have opened, to relieve the pressure of fluid against the opposite end of the piston before the normal control valves relieve the pressure of fluid thereto through the L 45. When the supply of fluid through hoses 31 is reversed, bucket 14 will start its movement back from the discharge position, and when a position slightly past upper dead center is reached, the full pressure of fluid will be exerted against the piston when port 37 is uncovered, in the manner described above.

During further return movement of bucket 14, the fluid supplied through tube 46 will force the piston toward the opposite end of the cylinder and this condition will continue until just before the piston reaches the end of its stroke in that direction. Of course, as soon as the pressure supplied through L 45 has been released, for instance through reversal of the supply of fluid through hoses 31 of FIG. 1, spring 75 will cause check valve 78 to be seated, as shown in FIG. 4, but the unloading valve 73 will remain unseated, due to fluid pressure thereagainst and later trapped in passage 77 and hole 80. However, when the piston approaches the opposite end of the cylinder, moving in the direction of dotted arrow 43 of FIG. 2, the end of check valve 78 will engage plate 39, thereby opening check valve 78 and causing fluid pressure around the piston rod 10 to be relieved through the then open unloading valve 73 and check valve 78, through a series of arcuate slots 85, conveniently milled in the wall of cylinder C at a position so that the slots 85 will bypass the piston ring 58. Thus, when check valve 78 is opened by engagement with plate 39, fluid on the rod side of the piston will flow to port 40, thereby providing, in effect, a cushioning, or at least a lessening of the force by which the piston is urged toward that end of the cylinder. It will be understood that, at this end of the cylinder, the pressure around the piston rod 10 is relieved primarily through reversal of flow and connection of the hose connected to tube 46 with the discharge or exhaust position of the valve controlling the same. At this time, spring 75 will reseat unloading valve 73, so that the piston P can then be forced in the opposite direction by fluid supplied through L 45. Thus, the unloading valve 73 will be closed but the check valve 78 will still be open, as shown, when piston P begins to move in the direction of solid arrow 42 of FIG. 2. The various parts will remain in the position shown in FIGS. 1 and 2, as the piston moves along its stroke in the direction of solid arrow 42, since fluid pressure supplied through port 40 will maintain check valve 78 open.

Figure 9:
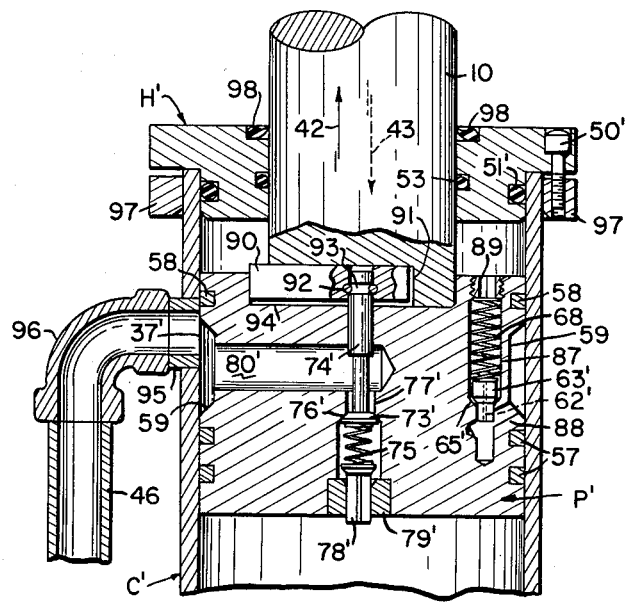
FIG. 9 is a fragmentary longitudinal section, illustrating an alternative construction.
Figure 10:
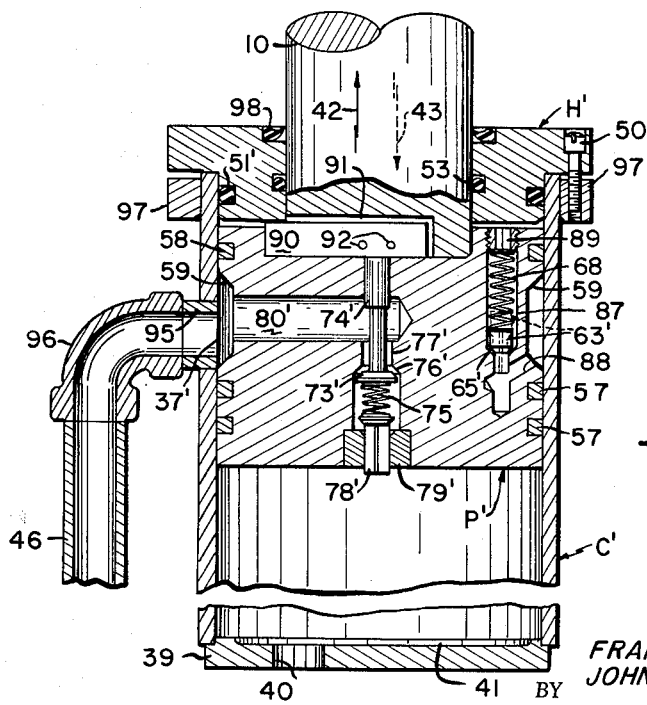
FIG. 10 is a similar but condensed longitudinal section, showing the piston in a slightly different position.

In the alternative embodiment of this invention illustrated in FIGS. 9 and 10, a piston P' may be connected to a piston rod 10 and moved within a cylinder C' in the same manner as previously. The piston P' may be provided with piston rings 57 and 58 and a circumferential groove 59, as before, so that when piston ring 58 clears the near side of a port 37', the flow of fluid being discharged through tube 46 will be shut off and a cushioning effect will be produced by the compression of fluid in the space between the piston P' and a head H', as in the position shown in FIG. 9. In this instance, the back pressure valve 63' is mounted in piston P' within a passage 87 provided with a seat 65', the passage 87 extending from the end of the piston adjacent rod 10 to a passage 88 which communicates with the groove 59. As will be evident, the open end of passage 87 forms an auxiliary port which communicates with the space between the piston and the first end of the cylinder. As before, the back pressure valve 63' is normally held against its seat by a spring 68, which bears at its opposite end against an apertured stop 89, which may be secured in the end of passage 87 in any suitable manner, as by threads. Back pressure valve 63' may also be provided with an orifice 62', in a manner similar to the orifice 62 of back pressure valve 63 of FIG. 8. As before, orifice 62' permits the cushioning fluid between piston P' and a head H' to bleed through passages 87 and 88, thence through groove 59 to port 37 for discharge through tube 46. An unloading valve 73' and a relief valve 78' operate similarly to the corresponding parts of FIGS 1-4, i.e., the relief valve 78' extends through an insert 79' installed in the center of piston P', at the outer end of an axial passage 77', the latter being provided with a seat 76' for unloading valve 73', while a spring 75 extends between the unloading valve 73' and relief valve 78'. The passage 77' may communicate with groove 59 through a hole 80', while the relief valve 78' is normally held open by pressure of fluid on the side of piston P' opposite the piston rod, as shown, during movement of the piston and piston rod in the direction of solid arrow 42 of FIG. 9.

In further accordance with this invention, the stem 74' of unloading valve 73' may be connected to a member which is adapted to engage the end of the cylinder, such as a bar 90, which is disposed within a slot 91 in the end of piston rod 10 and extends laterally to one side thereof so as to engage the inner end of head H' when the piston P' moves to the head end of the cylinder, as in FIG. 10. As will be evident, this will open unloading valve 73', so as to relieve pressure on the opposite side of the piston, through the passages 77' and 80' and port 37', at the end of the stroke in that direction. The end of stem 74' may be connected to bar 90 in any suitable manner, as by a pair of transverse pins 92 which engage an annular groove 93 in the stem, as in FIG. 9. Also, a countersink 94 in piston P', which accommodates the end of the piston rod 10, may be provided with a lateral extension to accommodate the laterally extending end of bar 90. As will be evident, when the valve 74' is assembled with the piston P', it is inserted from the opposite end and the bar 90 slipped thereover, so that the pins 92 may be readily slipped into position, the countersink 94 providing adequate space for this purpose. However, when piston rod 10 is attached to piston P', the slot 91 will register with bar 90 and the sides of slot 91 will prevent pins 92 from falling out. If desired, pins 92 may be locked in position, as by having an enlarged threaded portion, at one end, engaging corresponding threads in the holes in bar 90 adapted to receive the pins. Port 37' may be formed by a nipple 95 which is inserted in a hole drilled at a suitable position in the wall of cylinder C', and welded or otherwise suitably secured therein, while an L 96 may be attached, as by welding, brazing or the like, to the extending end of nipple 95 and to the end of tube 46. The head H' may be attached by cap bolts 50' to a ring 97, which may be welded or otherwise suitably secured to the cylinder C adjacent the piston rod end, while the head H' may also be provided with an outer groove adapted to receive a seal ring 51', which engages the inner wall of cylinder C', and an inner groove adapted to receive a seal ring 53, adapted to engage the piston rod 10. In addition, head H' may be provided with a groove adapted to receive a wiping disc 98, which operates in the manner previously described.

Upon a reversal of the fluid supply to port 37', as through the hoses 31 of FIG. 5, i.e., when fluid under pressure is again supplied through tube 46, the valve 78' will be closed, but the unloading valve 73' will remain open. In addition, the pressure of fluid supplied through port 37' to groove 59 and thence through passage 88 will unseat valve 63', as to the dotted position of FIG. 10, to supply fluid under pressure through passage 87 and the auxiliary port to the space between piston P' and head H', which will start the piston and piston rod moving in the direction of the dotted arrow 43 of FIG. 10. While the piston and piston rod will be moved relatively slowly at the start, as soon as the piston ring 58 uncovers the near edge of port 37', the full pressure of fluid will be supplied, as before, and the piston will thereupon be moved more rapidly toward the opposite end of the cylinder. As will be evident, as soon as the pressure in groove 59 and the pressure in the space between the piston and head H' is equalized, spring 68 will return valve 63' to its seat.

The opposite end of the cylinder C', as in FIG. 10, may be closed by a plate 39' having a well 41, but the port 40' is preferably placed in an off-center position, so that the position of the stem of valve 78' will not coincide with the port and the valve 78' can be opened by engagement with plate 39', when the piston closely approaches the end of the stroke in the direction of dotted arrow 43. The pressure of fluid behind the piston, around rod 10, may be relieved by such opening of valve 78, in the manner previously described, with cylinder C' again conveniently being provided with a suitable arrangement for bypassing ring 58, such as the arcuate slots 85 of cylinder C of FIG. 2.

From the foregoing, it will be evident that the piston and cylinder arrangement of this invention fulfills to a marked degree the requirements and objects hereinbefore set forth. As will be evident, the use of a main port spaced from one end of the cylinder permits the port to be covered and a cushion provided by the trapping of hydraulic fluid therein, as the piston approaches the end of its stroke in that direction. Also, by use of an unloading valve, which may be actuated in accordance with the position of the piston, such as when it nearly reaches the end of its stroke, the fluid pressure on the opposite side of the piston may be relieved, so as to further reduce any impact of parts being moved by the piston rod, when the piston reaches the end of the stroke. By use of an auxiliary port, which may be in either the cylinder or its head, or in the piston itself, the fluid under pressure may be supplied to the space between the piston and the cylinder head, as through a back pressure valve, even though the main port is closed off. A relief valve may also be installed in the piston and operate in conjunction with the unloading valve, to relieve fluid pressure behind the piston at the end of the opposite stroke. A bleed arrangement may also be provided, such as in the by-pass valve, so that the pressure on the cushioning fluid will be reduced, particularly toward the extreme end of the stroke, when the pressure may become rather high. As will be evident, a cylinder cushioning effect may be produced at each end of the cylinder, by spacing a main port from each end of the cylinder and providing a by-pass arrangement at each end, installed in either the head of the cylinder or in the piston itself. As will also be evident, the cushioning effect produced does not interfere with the rapidity of movement of the cylinder and piston over most of the travel thereof. As will further be evident, the piston and cylinder arrangement of this invention is particularly adapted to be used in connection with an overshot loader, but obviously is adapted to be used in connection with numerous other types of apparatus.

Although different embodiments of this invention have been illustrated and described, it will be understood that other embodiments may exist and various changes and variations may be made therein, all without departing from the spirit and scope thereof.

What is claimed is:

1. In a hydraulic cylinder and piston arrangement, including a cylinder having port means for the opposite ends thereof, a piston movable within said cylinder by pressure of hydraulic fluid on the respective opposite sides thereof, a piston rod connected to said piston and extending through at least one end of said cylinder, and means for supplying hydraulic fluid to and receiving hydraulic fluid from said port means, the improvement comprising a main port spaced from a first end of said cylinder, said piston covering said main port as said piston approaches said first end; an auxiliary port communicating with the space between said piston and cylinder at said first end; means for restricting the discharge of fluid through said auxiliary port, whereby fluid trapped between said piston and said first end of said cylinder will provide a cushion during movement of said piston between said main port and said first end of said cylinder; and means carried by said piston for relieving fluid pressure on the opposite side of said piston, through said piston and said main port, as said piston reaches said first end of said cylinder.

2. In a hydraulic cylinder and piston arrangement, as defined in claim 1, wherein said auxiliary port is formed in said cylinder.

3. In a hydraulic cylinder and piston arrangement, as defined in claim 2, wherein said cylinder includes a head at said one end and said auxiliary port is formed in said head.

4. In a hydraulic cylinder and piston arrangement, as defined in claim 1, wherein said auxiliary port is formed in said piston.

5. In a hydraulic cylinder and piston arrangement, as defined in claim 1, wherein said restricting means includes a valve passage having a seat; and a valve adapted to engage said seat to restrict flow from said cylinder and movable from said seat to permit flow to said cylinder.

6. In a hydraulic cylinder and piston arrangement, as defined in claim 5, wherein said valve is provided with a generally longitudinal orifice.

7. In a hydraulic cylinder and piston arrangement, as defined in claim 6, including a spring urging said valve toward said seat.

8. In a hydraulic cylinder and piston arrangement, as defined in claim 1, wherein said means carried by said piston includes a member adapted to engage said first end of said cylinder.

9. In a hydraulic cylinder and piston arrangement, as defined in claim 8, wherein said means carried by said piston includes a valve having a stem; and said member is attached to said valve stem.

10. In a hydraulic cylinder and piston arrangement, as defined in claim 1, wherein said means carried by said piston includes a valve having a stem extending from said piston and adapted to engage said first end of said cylinder to open said valve.

11. In a hydraulic cylinder and piston arrangement, as defined in claim 1, wherein said means carried by said piston includes a valve; a passage in said piston provided with a seat for said valve; and a groove on the circumferential exterior of said piston communicating with said valve passage and adapted to communicate with said main port.

12. In a hydraulic cylinder and piston arrangement, as defined in claim 1, wherein said means carried by said piston includes oppositely disposed valves adapted to seat in opposite directions.

13. In a hydraulic cylinder and piston arrangement, as defined in claim 12, including a passage in said piston having seats for said valves; and resilient means acting between said valves and urging each toward closed position.

14. In a hydraulic cylinder and piston arrangement, including a cylinder having port means for the opposite ends thereof, a piston movable within said cylinder by pressure of hydraulic fluid on the respective opposite sides thereof, a piston rod connected to said piston and extending through at least one end of said cylinder, and means for supplying hydraulic fluid to and receiving hydraulic fluid from said port means, the improvement comprising a cylinder having a port spaced from a first end of said cylinder, said piston covering said port as said piston approaches said first end and said piston having a passage therein provided with first and second, oppositely disposed valve seats, and means providing communication between said passage and said port when covered by said piston; a first valve in said passage for engaging said first seat; means for moving said first valve to an open position as said piston approaches said first end of said cylinder; a second valve in said passage for engaging said second valve seat, said second valve being movable to open position by pressure of fluid against said piston from the opposite end of said cylinder and said first valve being closed by such pressure; an auxiliary port communicating with the space between said piston and cylinder at said first end; and means for restricting the discharge of fluid through said auxiliary port, whereby fluid trapped between said piston and said first end of said cylinder will provide a cushion during movement of said piston between said main port and said first end of said cylinder.

15. In a hydraulic cylinder and piston arrangement, as defined in claim 14, including resilient means acting between said valves and urging each toward closed position.

16. In a hydraulic cylinder and piston arrangement, as defined in claim 14, wherein said hydraulic cylinder and piston are double acting; and including means for moving said second valve to an open position as said piston approaches the opposite end of said cylinder.

17. In a hydraulic cylinder and piston arrangement, as defined in claim 16, wherein each said means for moving said first and second valves to an open position includes a member projecting from said cylinder to engage the respective end of said cylinder.

18. In a double acting hydraulic cylinder and piston arrangement, including a cylinder having port means for the opposite ends thereof, a piston movable within said cylinder by pressure of hydraulic fluid on the respective opposite sides thereof, a piston rod connected to said piston and extending through at least one end of said cylinder, and means for supplying hydraulic fluid to and receiving hydraulic fluid from said port means, the improvement comprising a port spaced from a first end of said cylinder, said piston covering said port as said piston approaches said first end, whereby fluid trapped between said piston and said first end of said cylinder will provide a cushion during movement of said piston between said port and said first end of said cylinder; said piston having in the interior thereof a generally longitudinal, inclined passage provided with a valve seat facing the end of said cylinder opposite said first end, a circumferential groove communicating with said port when covered by said piston, and a hole extending between said groove and said passage at a position between said interior valve seat and the end of said piston facing said first end of said cylinder; a first valve movable into and out of engagement with said seat and disposed within said passage, said valve having a stem extending through said piston and projecting therefrom for engaging said first end of said cylinder as said piston approaches the same, to cause said first valve to open after said port is covered; an insert in the end of said passage opposite said valve seat, said insert having a passage therethrough and a beveled seat at the inner end of said passage; a second valve movable into and out of engagement with said beveled seat and provided with a stem extending through said passage in said insert and projecting from said piston with said second valve closed, said stem being engageable with the opposite end of said cylinder to open said second valve when said piston reaches the opposite end of said cylinder; a piston ring mounted circumferentially of said piston between said groove and said end of said piston facing said first end of said cylinder; at least one piston ring extending circumferentially around said piston and mounted between said groove and the end of said piston facing the opposite end of said cylinder; and a compression spring acting between said first and second valves and urging each toward closed position.

19. In a double acting hydraulic cylinder and piston arrangement, as defined in claim 18, wherein said cylinder is provided with a head and said head is provided with a passage communicating with said spaced port, said head passage having a valve seat therein and said head having a second passage providing communication between said first head passage beyond said valve seat and said first end of said cylinder; a valve disposed in said first head passage and movable into and out of engagement with said first passage seat, said valve having a longitudinal orifice therein and being seated by pressure of fluid trapped between said piston and said first head of said cylinder; and a spring urging said last mentioned valve toward said seat.

20. In a double acting hydraulic cylinder and piston arrangement, including a cylinder having port means for the opposite ends thereof, a piston movable within said cylinder by pressure of hydraulic fluid on the respective opposite sides thereof, a piston rod connected to said piston and extending through at least one end of said cylinder, and means for supplying hydraulic fluid to and receiving hydraulic fluid from said port means, the improvement comprising a port spaced from a first end of said cylinder, said piston covering said port as said piston approaches said first end, whereby fluid trapped between said piston and said first end of said cylinder will provide a cushion during movement of said piston between said port and said first end of said cylinder; said piston having a circumferential groove communicating with said port when covered by said piston, an axial passage provided with a valve seat facing the end of said piston opposite said first end of said cylinder and a hole extending from said groove to said passage between said seat and the end of said piston facing said first end of said cylinder; a piston rod provided with a lateral slot in the end and attached to said piston and extending through said first end of said cylinder; a first valve in said passage and engageable with said valve seat, said valve having a stem extending axially through said piston and into said slot in said piston rod; a bar disposed in said piston rod slot and extending laterally from said piston rod and also longitudinally from said piston; means connecting said valve stem with said bar so as to open said first valve when said bar engages said first end of said cylinder; an insert in the opposite end of said passage and having a hole therethrough provided with a beveled surface at its inner end; a second valve engageable with said beveled surface and provided with a stem extending through said hole, said stem being adapted to engage the opposite end of said cylinder upon approach of said piston thereto, so as to open said second valve; and a compression spring between said first and second valves and urging each toward closed position.

21. In a double acting hydraulic cylinder and piston arrangement, as defined in claim 20, wherein said piston is provided with a longitudinal passage extending into said piston from said end facing said first end of said cylinder and spaced radially outwardly from said piston rod, said passage providing an auxiliary port communicating with the space between said piston and said first end of said cylinder; a hole providing communication between the inner end of said passage and said groove, said passage having a valve seat therein; a valve in said passage and engageable with said seat, said valve having a longitudinal orifice therein and being movable to closed position by pressure of fluid trapped between said piston and said first end of said cylinder; an apertured stop mounted in the open end of said passage; and a compression spring bearing between said stop and said last mentioned valve.

22. In a double acting hydraulic cylinder and piston arrangement, including a cylinder having port means for the opposite ends thereof, a piston movable within said cylinder by pressure of hydraulic fluid on the respective opposite sides thereof, a piston rod connected to said piston and extending through at least one end of said cylinder, and means for supplying hydraulic fluid to and receiving hydraulic fluid from said port means, the improvement comprising a port spaced from a first end at said cylinder, said piston covering said port as said piston approaches said first end, whereby fluid trapped between said piston and said first end of said cylinder will provide a cushion during movement of said piston between said port and said first end of said cylinder; said piston being provided with a circumferential groove communicating with said port when said port is covered by said piston and a longitudinal passage extending into said piston from said end facing said first end of said cylinder and spaced radially outwardly from said piston rod, said passage providing an auxiliary port communicating with the space between said piston and said first end of said cylinder; a hole providing communication between the inner end of said passage and said groove, said passage having a valve seat therein; a valve in said passage and engageable with said seat, said valve having a longitudinal orifice therein and being movable to closed position by pressure of fluid trapped between said piston and first end of said cylinder; an apertured stop mounted in the open end of said passage; and a compression spring bearing between said stop and said valve.

References Cited in the file of this patent

UNITED STATES PATENTS

| | | |
|---|---|---|
| 2,655,002 | Terhune | Oct. 13, 1953 |
| 2,709,420 | Fulwood et al. | May 31, 1955 |
| 2,849,263 | Johnston | Aug. 26, 1958 |

FOREIGN PATENTS

| | | |
|---|---|---|
| 1,014,847 | Germany | Aug. 29, 1957 |